United States Patent
Lowenthal et al.

(10) Patent No.: US 8,680,813 B2
(45) Date of Patent: Mar. 25, 2014

(54) DETECTING AND RESPONDING TO UNEXPECTED ELECTRIC VEHICLE CHARGING DISCONNECTIONS

(75) Inventors: Richard Lowenthal, Cupertino, CA (US); Milton Tormey, Los Altos, CA (US); David Baxter, Monte Sereno, CA (US); James Solomon, Saratoga, CA (US)

(73) Assignee: Chargepoint, Inc., Campbell, CA (US)

( * ) Notice: Subject to any disclaimer, the term of this patent is extended or adjusted under 35 U.S.C. 154(b) by 63 days.

(21) Appl. No.: 12/372,724

(22) Filed: Feb. 17, 2009

(65) Prior Publication Data

US 2010/0207588 A1   Aug. 19, 2010

(51) Int. Cl.
H02J 7/00 (2006.01)
B60L 11/18 (2006.01)

(52) U.S. Cl.
CPC ................................. *B60L 11/1838* (2013.01)
USPC .......................................................... 320/109

(58) Field of Classification Search
USPC .......................................... 320/109, DIG. 13
See application file for complete search history.

(56) References Cited

U.S. PATENT DOCUMENTS

| | | | | |
|---|---|---|---|---|
| 4,383,210 A | * | 5/1983 | Wilkinson | 320/109 |
| 5,327,066 A | * | 7/1994 | Smith | 320/109 |
| 5,596,258 A | | 1/1997 | Kimura et al. | |
| 5,812,643 A | * | 9/1998 | Schelberg et al. | 379/93.12 |
| 5,952,813 A | | 9/1999 | Ochiai | |
| 6,067,008 A | * | 5/2000 | Smith | 340/438 |
| 6,194,866 B1 | * | 2/2001 | Olsson | 320/106 |
| 6,794,849 B2 | | 9/2004 | Mori et al. | |
| 7,375,491 B2 | * | 5/2008 | Lin | 320/107 |
| 7,411,371 B2 | | 8/2008 | Hobbs | |
| 2006/0164038 A1 | * | 7/2006 | Demers et al. | 320/116 |
| 2008/0218122 A1 | * | 9/2008 | Takano et al. | 320/109 |

FOREIGN PATENT DOCUMENTS

WO   WO 2007/141543 A2   12/2007

OTHER PUBLICATIONS

Elektrobay, "User Instructions: A simple step-by-step guide to recharging your electric vehicle," www.elektromotive.com, Elektromotive LTD. 2008. 3 pages
PCT International Search Report and Written Opinion for PCT/US2010/024502, mailed Apr. 21, 2010, 10 pages.

\* cited by examiner

*Primary Examiner* — Yalkew Fantu
*Assistant Examiner* — Manuel Hernandez
(74) *Attorney, Agent, or Firm* — Blakely, Sokoloff, Taylor & Zafman LLP

(57) ABSTRACT

An electrical vehicle charging station establishes a charging session with an electric vehicle which includes energizing a power receptacle in the charging station and receiving a charging cord at the power receptacle. While the charging session is established and responsive to detecting that a charging connection between the electric vehicle and the electric vehicle charging station has been unexpectedly disconnected, the power receptacle is de-energized to prevent electricity from flowing through the charging cord.

17 Claims, 7 Drawing Sheets

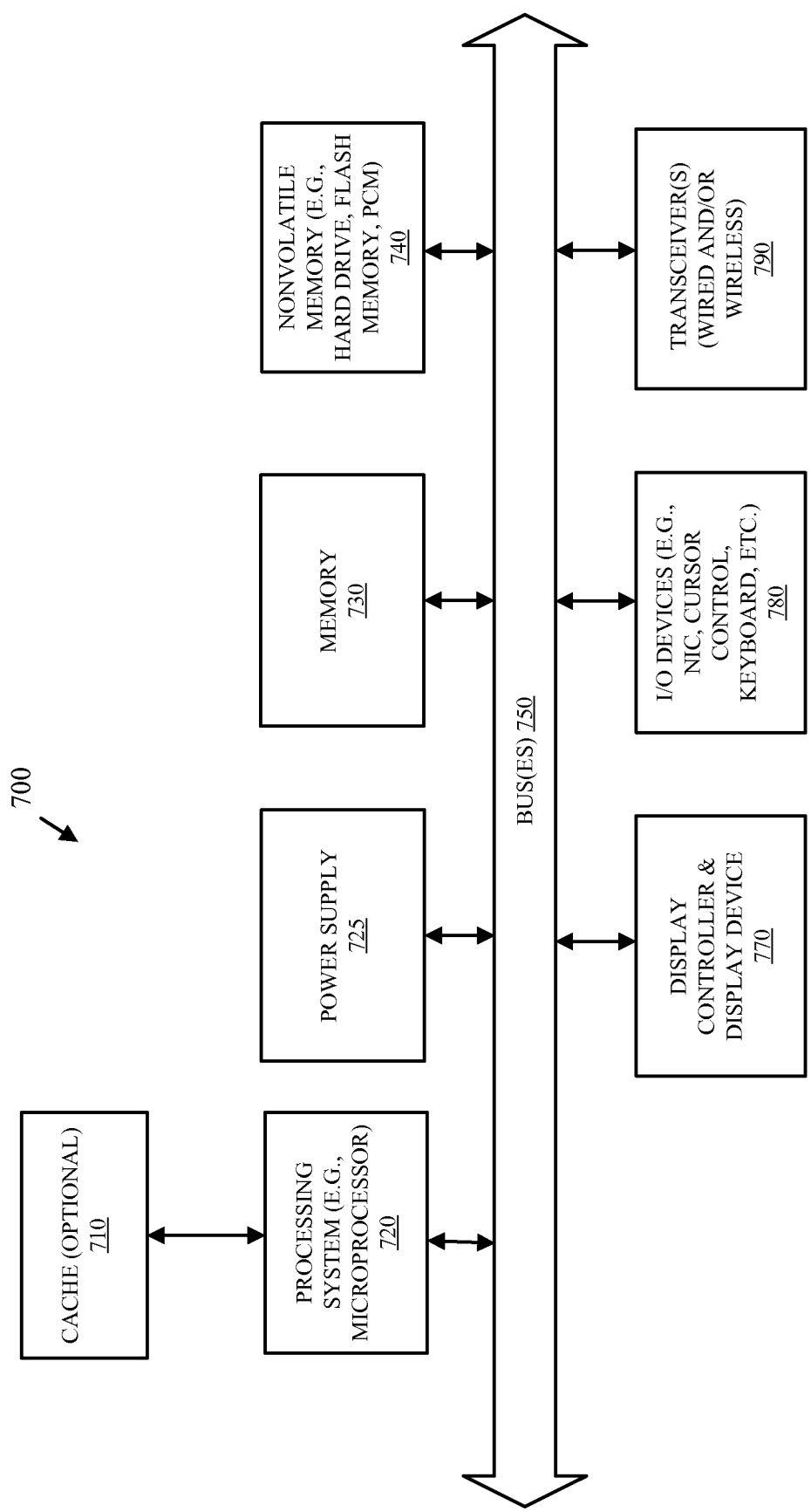

DETECTING AND RESPONDING TO UNEXPECTED ELECTRIC VEHICLE CHARGING DISCONNECTIONS

BACKGROUND

1. Field

Embodiments of the invention relate to the field of charging electric vehicles, and more specifically to detecting and responding to unexpected electric vehicle charging disconnections.

2. Background

Charging stations are typically used to provide charging points for electric vehicles (e.g., electric battery powered vehicles, gasoline/electric battery powered vehicle hybrid, etc.). Since vehicles with electric batteries must periodically recharge their electric battery(ies) (or other electricity storage devices such as supercapacitors), charging stations provide convenient access for that charging. For example, charging stations may be located in designated charging locations (e.g., similar to locations of gas stations), parking spaces (e.g., public parking spaces and/or private parking space), etc.

A typical charging station includes a power receptacle to receive an electrical plug (coupled with the battery). The charging station may include a door, which may be lockable, to cover and protect the power receptacle and prevent unauthorized access to the power receptacle. For example, prospective customers typically request service from the charging station (e.g., by waving a radio-frequency identification (RFID) device near a RFID receiver on the charging station). If the customer is authorized, the door will unlock allowing the customer to plug their charging cord into the receptacle. The door locks when shut (with the cord inside) which prevents an unauthorized removal of the charging cord. The door may be unlocked by the same customer (e.g., by waving the same RFID device near the RFID receiver on the charging station) in order to remove the charging cord.

Typically, the customer also needs to connect the charging cord to the electricity storage device (e.g., battery, supercapacitor, etc.) (or a connector to the electricity storage device) of their vehicle. Typically, these charging cords are not secure at the vehicle and may be removed by anyone.

BRIEF DESCRIPTION OF THE DRAWINGS

The invention may best be understood by referring to the following description and accompanying drawings that are used to illustrate embodiments of the invention. In the drawings:

FIG. 7 is a block diagram illustrating an exemplary architecture of a charging station that may be used in some embodiments of the invention.

DETAILED DESCRIPTION

Figure 1:
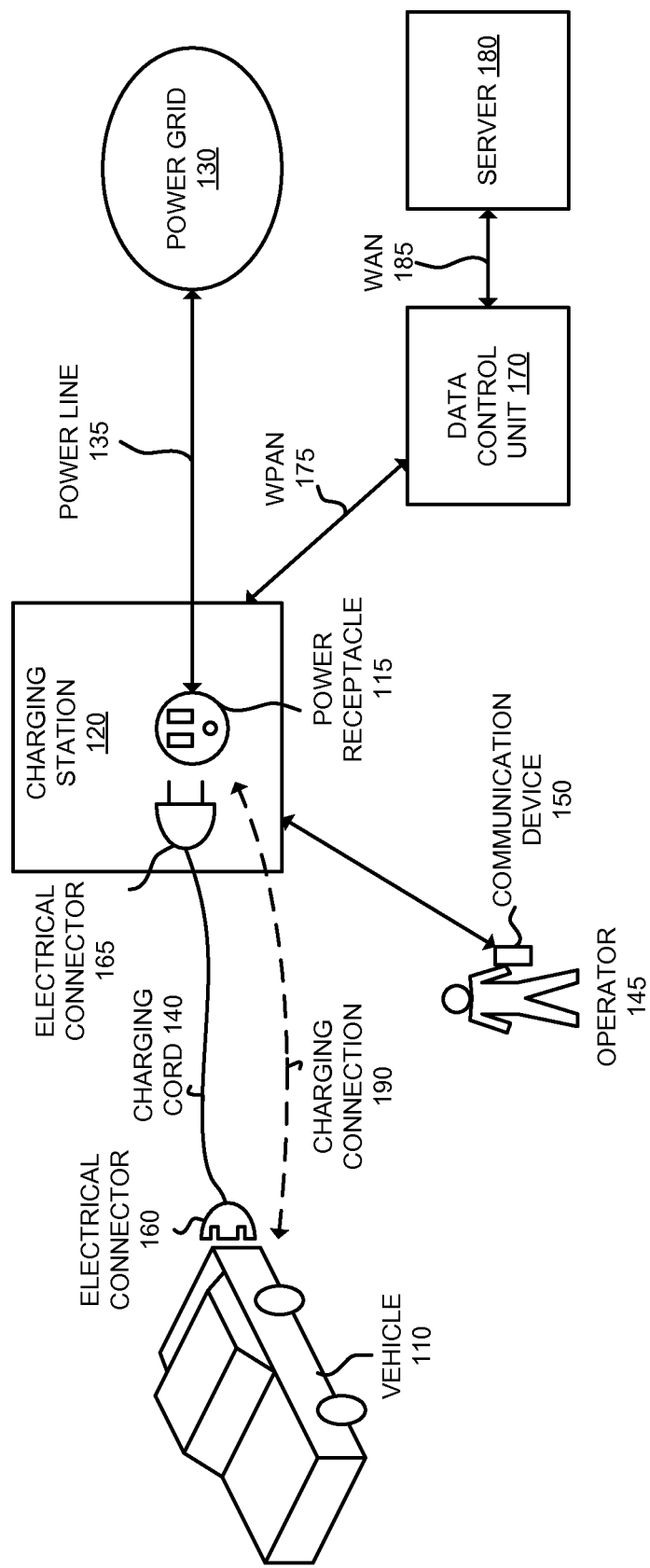
FIG. 1 illustrates an exemplary charging system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more computing devices (e.g., charging stations, servers, etc.). As used herein, a charging station is a piece of equipment, including hardware and software, to charge electrical vehicles. Such computing devices store and communicate (internally and with other devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given device typically stores code and/or data for execution on the set of one or more processors of that device. Of course, one or more parts of an embodiment of the invention may be implemented using different combinations of software, firmware, and/or hardware.

A method and apparatus for detecting and responding to unexpected electric vehicle charging disconnections is described. In one embodiment of the invention, an electric vehicle charging station establishes a charging session with an electric vehicle (e.g., an electric powered vehicle, a gasoline/electric powered vehicle hybrid, etc.) which includes energizing a power receptacle in the charging station, and responsive to detecting that a charging connection between the electric vehicle and the electric vehicle charging station has been unexpectedly disconnected (e.g., the charging cord of the vehicle has been unexpectedly removed from the vehicle but remains plugged into the charging station during charging, the charging cord has been severed during charging, etc.), de-energizing the power receptacle to prevent electricity from flowing through the charging cord.

In one embodiment of the invention, the charging station detects that a charging connection has been unexpectedly disconnected by monitoring the electricity flowing through the power receptacle in an established charging session, where if the electricity drops below a minimum amount over a minimum amount of time, the charging station determines that the charging connection has been unexpectedly disconnected.

FIG. 1 illustrates an exemplary charging system according to one embodiment of the invention. The charging system illustrated in FIG. 1 includes the electric vehicle charging station 120 (hereinafter referred to as the "charging station 120"), which is coupled with the power grid 130 over the power line 135. The power grid 130 may be owned and/or operated by local utility companies or owned and/or operated by private persons/companies. The charging station 120 is also coupled with the data control unit 170 over the WPAN (Wireless Personal Area Network) line 175 (e.g., Bluetooth, ZigBee, etc.) or WLAN (Wireless Local Area Network) (e.g., WiFi, etc.). The data control unit 170 is coupled with the server 180 over the WAN (Wide Access Network) connection 185 (e.g., Cellular (CDMA, GPRS, etc.), WiFi Internet connection, Plain Old Telephone Service modem, leased line, etc.). The data control unit 170 relays messages between the charging station 120 and the server 180. According to one embodiment of the invention, the data control unit 170 is part of another charging station as will be described in more detail with reference to FIG. 2.

The charging station 120 controls the application of electricity from the power grid 130 to the power receptacle 115. The power receptacle 115 may be any number of types of receptacles such as receptacles conforming to the NEMA (National Electrical Manufacturers Association) standards 5-1 5, 5-20, and 14-50 or other standards (e.g., BS 1363, CEE7, etc.) and may be operating at different voltages (e.g., 120V, 240V, 230V, etc.). According to one embodiment of the invention, a lockable door covers the power receptacle 115 and is locked in a closed position (without a cord being plugged in while the charging station 120 is not in use) and locked in a charging position (while a cord is plugged into the power receptacle during a charging session). While the door is locked in the charging position, the charging cord plugged into the power receptacle 115 cannot be removed. Only authorized vehicle operators (those authorized to use the charging station 120) and authorized administrative personnel can unlock the door to access the power receptacle 115. Thus, access to the power receptacle 115 is limited to authorized vehicle operators and administrative personnel (e.g., utility workers, operators of the charging system network, etc.). Thus, the locking door protects the power receptacle 115 while the charging station 120 is not in use and also prevents charging cords from being unplugged by unauthorized persons during charging.

Operators of electric vehicles use the charging station 120 to charge their electric vehicles. The electricity storage devices (e.g., batteries, supercapacitors, etc.) of electric vehicles (e.g., electric powered vehicles, gasoline/electric powered vehicle hybrids, etc.) may be charged through use of the charging station 120. In one embodiment of the invention, the operators of electric vehicles provide their own charging cord to charge their electric vehicle. For example, the electric vehicle operator 145 plugs the electrical connector 160 of the charging cord 140 into on-board charging circuitry of the electric vehicle 110 (which is coupled with the electricity storage device of the vehicle 110) and plugs the electrical connector 165 of the charging cord 140 into the power receptacle 115 to create the charging connection 190.

Electric vehicles can also transfer electricity to the power grid 130 (hereinafter referred to as "vehicle-to-grid" (V2G). V2G is particularly attractive for electric vehicles which have their own charging devices, such as battery electric vehicles with regenerative braking and plug-in hybrid vehicles. Thus, in some embodiments of the invention, the electric vehicle 110 may consume electricity from the power grid 130 as well as transfer electricity to the power grid 130.

The electric vehicle operator 145 may use the communication device 150 to initiate and request a charging session for the electric vehicle 110. The communication device 150 may be a WLAN or WPAN device (e.g., one or two-way radio-frequency identification (RFID) device, mobile computing device (e.g., laptops, palmtop, smartphone, multimedia mobile phone, cellular phone, etc.), ZigBee device, etc). The communication device 150 communicates unique operator-specific information (e.g., operator identification information, etc.) to the charging station 120 (either directly or indirectly through the server 180). In case the communication device 150 is a RFID device, the operator 145 presents the communication device 150 to the charging station 120 to initiate a charging session for the vehicle 110.

Based on the information communicated by the communication device 150, a determination is made whether the operator 145 is authorized to use the charging station 120 and thus may access the power receptacle 115. In one embodiment of the invention, the charging station 120 locally determines whether the operator 145 is authorized (e.g., by checking whether the operator 145 is represented on a list of authorized users stored in the charging station 120). In another embodiment of the invention, the charging station 120 may transmit an authorization request that includes the information read from the communication device 150 to the server 180 (through the data control unit 170) for authorization. In another embodiment of the invention, the server 180 receives the charging session request from the operator 145 directly and determines whether the operator 145 is authorized. In any of these embodiments, if the operator 145 is authorized, the charging station 120 energizes the power receptacle 115. Additionally, if there is a locked door covering the power receptacle 115, the charging station 120 unlocks that door to allow the operator 145 to plug in the charging cord 140.

It should be understood that the operator 145 may request a charging session from the charging station 120 differently in some embodiments of the invention. For example, the operator 145 may interact with a payment station coupled with the charging station 120, which may then send appropriate instructions to the charging station 120 regarding the charging of the vehicle 110 (e.g., instructions to unlock the door covering the power receptacle 115, energize the power receptacle 115, etc.). The payment station may function similarly to a payment station for a parking space. In addition, the payment station coupled with the charging station may be used both for parking payment and charging payment.

The server 180 provides services for multiple charging stations. The server 180 stores vehicle operator information (e.g., operator account information, operator contact information (e.g., operator name, street address, email address, telephone number, etc.)) and typically is responsible for accounting (e.g., amount of electricity purchased by individual vehicle operators, etc.). In one embodiment of the invention, the server 180 includes a subscriber portal (available through the Internet) which allows subscribers (owners and operators of electric vehicles) to register for service (which may include providing information regarding their electric vehicles, providing payment information, providing contact information, etc.) and perform other functions (e.g., pay for charging sessions, determine availability of charging stations, check the charging status of their electric vehicle(s), etc.).

In one embodiment of the invention, the server 180 includes a host portal (available through the Internet) which allows owners or administrators of the charging station to configure their charging stations and perform other functions (e.g., determine average usage of charging stations, etc.). Charging stations may also be configured using other means (e.g., through Telnet, user interface, etc.) in some embodiments of the invention.

After a charging session has been established with the vehicle 110, and the charging cord 140 has been plugged into the electric vehicle 110, the charging connection 190 is established and electricity may begin flowing through the charging cord 140. It should be understood that the flow of electricity may be from the charging station 120 to the electric vehicle 110 or from the electric vehicle 110 to the charging station 120 (e.g., in a V2G case).

Figure 2:
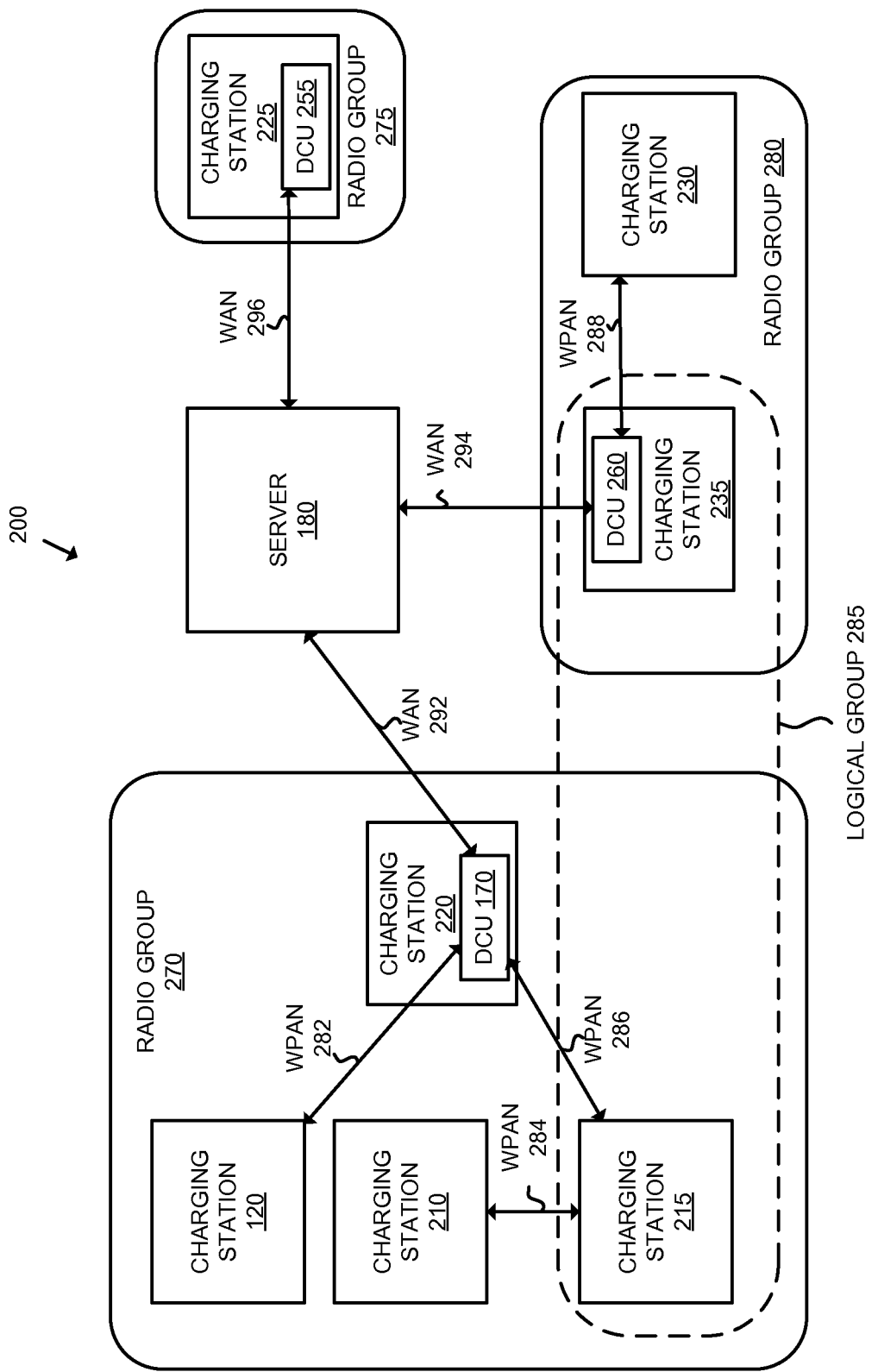
FIG. 2 illustrates an exemplary network of charging stations according to one embodiment of the invention.

While FIG. 1 illustrates a single charging station 120, it should be understood that many charging stations may be networked to the server 180 (through one or more data control units) and/or to each other. FIG. 2 illustrates an exemplary network of charging stations according to one embodiment of the invention. The charging station network 200 includes the server 180 and the charging stations 120, 210, 215, 220, 225, 230, and 235. The server 180 is providing services for each of the charging stations 120, 210, 215, 220, 225, 230, and 235. The charging stations 120, 210, 215, and 220 are part of the radio group 270. The charging stations 230 and 235 are part of the radio group 280. The charging station 225 is the only charging station in the radio group 275. As used herein, a radio group is a collection of one or more charging stations that collectively has a single connection to a server. Each radio group includes one or more data control units (DCUs) which connect the charging stations with the server. Typically, DCUs are implemented along with a charging station. However, a data control unit may be implemented separately from any charging station.

Each DCU acts as a gateway to the server 180 for those charging stations that are coupled with that DCU. It should be understood that charging stations need not have a direct link to a DCU (e.g., a charging station may be directly linked to another charging station which itself has a direct link to a DCU). For example, DCU 170 (of the radio group 270 and implemented in the charging station 220) is coupled with the server 180 through the WAN link 292 and is coupled with each of the charging stations 120, 210, and 215. The charging stations 120 and 215 are directly coupled with the DCU 170 via the WPAN links 282 and 286 respectively. The charging station 210 is indirectly coupled with the DCU 170 via the WPAN link 284 to the charging station 215 which is itself directly coupled with the DCU 170 via the WPAN link 286. Thus, the charging stations 120, 210, and 215 transmit messages to, and receive messages from, the server 180 via the DCU 170. The DCU 225 (of the radio group 275 and part of the charging station 225) is coupled with the server 180 through the WAN link 296. The DCU 260 (of the radio group 280) is coupled with the server 180 through the WAN link 294 and is coupled with the charging station 230 via the WPAN link 288.

Radio groups represent the network topology of a collection of charging stations. Typically, these charging stations are located relatively close (e.g., on the same street, in the same parking garage, in the same block, etc.). In addition to radio groups, administrator defined collection of charging stations may also be defined. For example, the charging stations 215 and 235 are part of the logical group 285. Logical groups are a collection of one or more charging stations that an administrator defines. Typically, the charging stations included in a logical group share some set of common features. As illustrated in FIG. 2, logical groups may include charging stations from different radio groups.

It should be understood that the network architecture illustrated in FIG. 2 is exemplary, and other architectures may be used in embodiments of the invention (e.g., each charging station may have a direct connection with the server 180).

Figure 3:
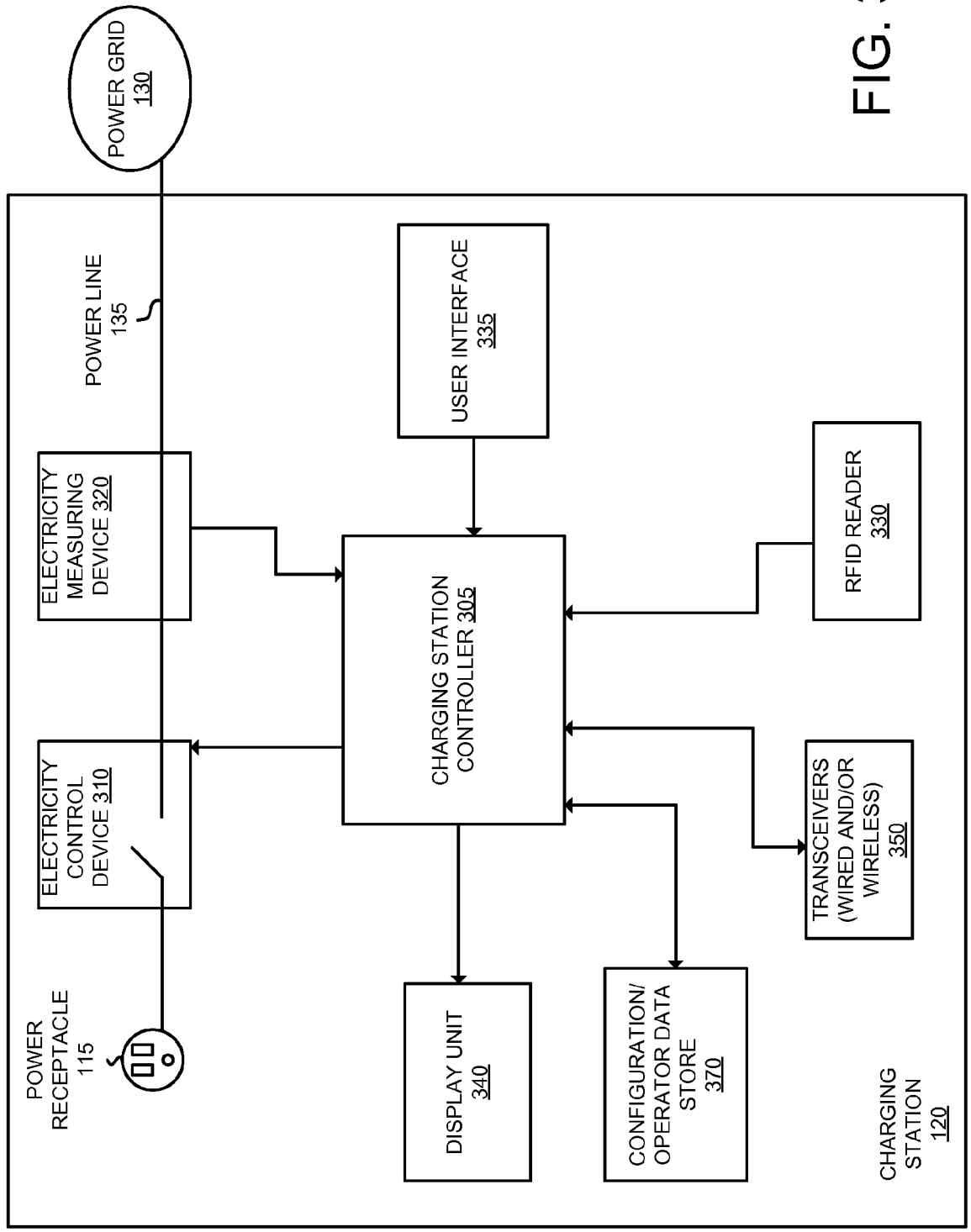
FIG. 3 illustrates an exemplary embodiment of the charging station illustrated in FIG. 1 according to one embodiment of the invention.

FIG. 3 illustrates an exemplary embodiment of the charging station 120 according to one embodiment of the invention. The charging station 120 includes the charging station controller 305, the electricity control device 310, the electricity measuring device 320, the RFID reader 330, the user interface 335, the display unit 340, and one or more transceivers 350 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)). It should be understood that FIG. 3 illustrates an exemplary architecture of a charging station, and other, different architectures may be used in embodiments of the invention described herein. For example, some implementations of charging stations may not include a user interface, an RFID reader, or a connection to a network.

The RFID reader 330 reads RFID tags from RFID enabled devices (e.g., smartcards, key fobs, etc., embedded with RFID tag(s)) of operators that want to use the charging station 120. For example, the operator 145 may wave/swipe the communication device 150 (if an RFID enabled device) near the RFID reader 330 to initiate a charging session from the charging station 120.

The RFID reader 330 passes the information read to the charging station controller 305. The charging station controller 305 is programmed to include instructions that establish charging sessions with the vehicles. According to one embodiment of the invention, a charging session is established after an operator has been authenticated and authorized to initiate a charging session (e.g., may use the charging station 120 at the particular time of the day), after a charging cord has been plugged into the power receptacle 115, and after the door to the power receptacle 115 has been closed and locked. The operator 145 is authenticated and authorized based on the information the RFID reader 330 receives. While in one embodiment of the invention the charging station 120 locally stores authentication information (e.g., in the configuration/operator data store 370), in other embodiments of the invention the charging station controller 305 transmits an authorization request with a remote device (e.g., the server 180) via one of the transceivers 350. For example, the charging station controller causes an authorization request to be transmitted to the data control unit 170 over a WPAN transceiver (e.g., Bluetooth, ZigBee) or a LAN transceiver. The data control unit 170 relays the authorization request to the server 180.

In some embodiments of the invention, in addition to or in lieu of vehicle operators initiating charging sessions with RFID enabled devices, vehicle operators may use the user interface 335 to initiate charging sessions. For example, vehicle operators may enter in account and/or payment information through the user interface 335. For example, the user interface 335 may allow the operator 145 to enter in their username/password (or other information) and/or payment information. In other embodiments of the invention, vehicle operators may request charging sessions through devices remote to the charging station 120 (e.g., payment stations coupled with the charging stations).

After authorizing the operator 145, the charging station controller 305 causes the power receptacle 115 to be energized and the door covering the power receptacle 115 (if a locked door is covering the power receptacle 115) to unlock. For example, the charging station controller 305 causes the electricity control device 310 to complete the connection of the power line 135 to the power grid 130. The electricity control device 310 is a solid-state device that is controlled by the charging station controller 305 or any other device suitable for controlling the flow of electricity. In addition, the charging station controller 305 causes the door covering the power receptacle 115 to unlock allowing the operator 145 to plug in their charging cord to the power receptacle 115.

In one embodiment of the invention, the charging station 120 includes one or more sensors that may be used to detect when a charging cord has been plugged into the power receptacle 115. The sensors may be a pair of infrared emitting diodes (IRED) and a phototransistor or a photodiode. An IRED emits light and a phototransistor or photodiode detects the light and converts the light into current. When the power receptacle 115 receives a plug, that plug breaks the light causing the phototransistor to stop converting light into current. In this way, the charging station 120 may determine if a plug has been inserted into the power receptacle 115. It should be understood that other sensor technologies may be used to detect whether a plug has been received at the power receptacle 115 (e.g., a microswitch pushbutton, mechanical power receptacle cover that must be rotated, etc.). In addition, in some embodiments of the invention, the charging station 120 also includes sensors to detect whether the door covering the power receptacle 115 is closed and locked.

The electricity measuring device 320 measures the amount of electricity that is flowing on the power line 135 through the power receptacle 115. While in one embodiment of the invention the electricity measuring device 320 measures flow of current, in an alternative embodiment of the invention the electricity measuring device 320 measures power draw. The electricity measuring device 320 may be an induction coil or other devices suitable for measuring electricity. The charging station controller 305 is programmed with instructions to monitor the electricity measuring device 320 and to calculate the amount of electricity being used over a given time period.

The display unit 340 is used to display messages to the operator 145 (e.g., charging status, confirmation messages, error messages, notification messages, etc.). The display unit 340 may also display parking information if the charging station 120 is also acting as a parking meter (e.g., amount of time remaining in minutes, parking violation, etc.).

The charging station controller 305 is also programmed with one or more instructions to detect and respond to unexpected electric vehicle charging disconnections (e.g., if a charging cord has been unplugged from one vehicle in order to plug it into a different vehicle during an established charging session, if a charging cord has been severed during an established charging session, or the charging connection has otherwise been unexpectedly disconnected). For example, with reference to FIGS. 1 and 3, the charging station controller 305 is programmed with one or more instructions to determine whether, while a charging session is established with the vehicle 110, the charging connection 190 is unexpectedly disconnected (e.g., the charging cord 140 has been unplugged from the vehicle 110 while remaining plugged into the power receptacle 115, the charging cord 140 has been severed, etc.). The charging station controller 305 is further programmed to prevent the flow of electricity through the charging cord responsive to detecting that the charging connection has unexpectedly been disconnected (e.g., by de-energizing the power receptacle 115).

The configuration/operator data store 370 stores configuration information which may be set by administrators, owners, or manufacturers of the charging station 120 (e.g., values used in determining whether a charging connection has been unexpectedly disconnected, whether the charging connection unexpected disconnection detection and response mechanism is enabled, etc.) and in some embodiments operator specific information (e.g., a list of authorized operators that may use the charging station 120, etc.).

Figure 4:
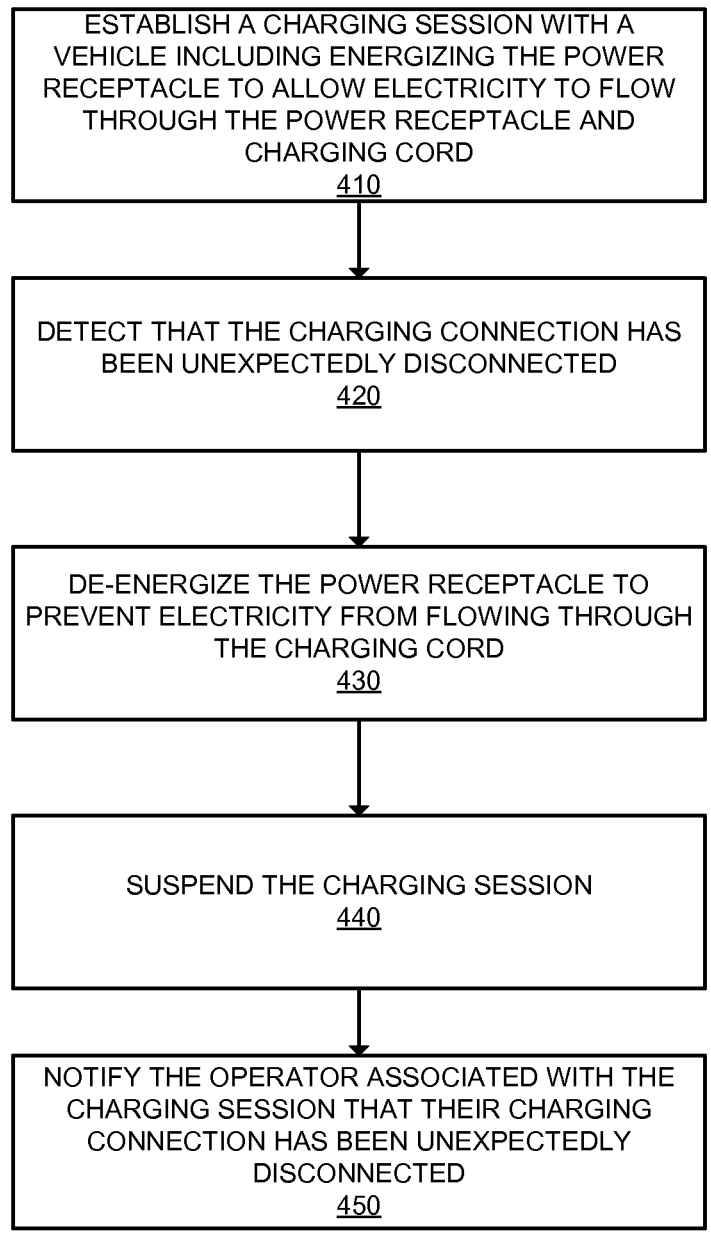
FIG. 4 is a flow diagram illustrating exemplary operations for detecting and responding to unexpected electric vehicle charging disconnections according to one embodiment of the invention.

FIG. 4 is a flow diagram illustrating exemplary operations for detecting and responding to unexpected electric vehicle charging disconnections according to one embodiment of the invention. The operations of FIG. 4 will be described with reference to the exemplary embodiments of FIGS. 1 and 3. However, it should be understood that the operations of FIG. 4 can be performed by embodiments of the invention other than those discussed with reference to FIGS. 1 and 3, and the embodiments discussed with reference to FIGS. 1 and 3 can perform operations different than those discussed with reference to FIG. 4.

At block 410, the charging station controller 305 establishes a charging session with the vehicle 110 including energizing the power receptacle 115 to allow electricity to flow through the power receptacle 115 and through the charging cord 140. The charging session is initiated by a request from the operator 145 (e.g., by the operator 145 waving/swiping a RFID enabled device near the RFID reader 330 of the charging station 120). In addition to energizing the power receptacle, establishing a charging session may also include authenticating and authorizing the operator 145, unlocking a door covering the power receptacle 115, detecting that a plug of a charging cord (e.g., the electrical connector 165) is inserted into the power receptacle 115, and detecting that the door covering the power receptacle 115 has been closed and locked. Flow moves from block 410 to block 420.

At block 420, the charging station controller 305 detects that the charging connection has been unexpectedly disconnected (e.g., the charging cord 140 has been unplugged from the vehicle 110 (the electrical connector 160 has been removed from the vehicle 110) while the cord 140 remains plugged into the power receptacle 115, the electrical connection to the vehicle 110 has been broken while the cord 140 remains plugged into the power receptacle 115 (e.g., the charging cord 140 has been severed), etc.). Flow moves from block 420 to block 430.

According to one embodiment of the invention, the charging station controller 305 detects whether a charging connection has been unexpectedly disconnected by detecting that the electricity flowing through the power receptacle (and thus through the charging cord) has dropped below a threshold amount (hereinafter referred to as "trigger amount") over a specified period of time (hereinafter referred to as "trigger time"). For example, the electricity measuring device 320 measures the electricity flowing and provides the data to the charging station controller 305. As an example, if the charging station controller 305 detects that the current flowing through the power receptacle 115 has dropped below 0.005 Amps for a period of 5 seconds, it can be assumed that the charging cord has been unplugged from the vehicle 110 (or the electrical connection between the power receptacle 115 and the vehicle 110 has otherwise been disrupted). In some embodiments of the invention, the trigger amount and the trigger time are each configurable (e.g., by the operator/administrator of the charging station 120).

It should be understood that fully charged electricity storage devices consume a small amount of electricity. Typically, the amount of electricity drawn by a fully charged electricity storage device is greater than the trigger amount threshold.

At block 430, the charging station controller 305 causes the power receptacle 305 to be de-energized to prevent electricity from flowing through the power receptacle and through the charging cord 140. For example, the charging station controller 305 instructs the electricity control device 310 to stop the flow of electricity to the power receptacle 315. Flow moves from block 430 to block 440.

At block 440, the charging station controller suspends the charging session. The charging session will be suspended until the operator intervenes (e.g., presents the same RFID device to the RFID reader 330) or until an administrator of the operator 120 intervenes. While the charging session is suspended, the electrical connector 165 will remain locked and plugged into the power receptacle 115. Flow moves from block 440 to block 450.

At block 450, the charging station controller 305 notifies the operator associated with the charging session (e.g., the operator 145 (or other person/entity that the operator 145 designates)) that the charging connection has been disconnected. This notification may take different forms in different embodiments of the invention, including transmitting an email message to the operator at an email address associated with the operator (typically provided during registration), transmitting a text message (SMS message) to the operator (at a number typically provided during registration), and/or displaying an error message on the display unit 340 (e.g., cord unplugged—session stopped). While in one embodiment of the invention the charging station 120 directly transmits a notification message to the operator 145 (via an email message and/or text message), in alternative embodiments of the invention the charging station controller 305 transmits a notification message request to a remote device (e.g., the server 180) to form and/or transmit the notification message to the operator 145 on behalf of the charging station. The notification message request will include an identifier of the operator 145 (e.g., the RFID tag used by the operator 145 when initiating the charging the session) and the nature of the request (e.g., notify-plug-out).

In one embodiment of the invention, operators of electric vehicles may configure whether they receive notification messages when their charging connection has been unexpectedly disconnected.

Thus, the charging station 120 can switch off the electricity flowing through the charging cord upon detecting that a charging connection has been unexpectedly disconnected. This helps prevent and deter theft of electricity. For example, since the charging station 120 prevents the flow of electricity through the charging cord upon detecting an unexpected charging connection disconnection, a person trying to steal electricity (e.g., by unplugging the charging cord from one vehicle and plugging it into their own vehicle or other electrical device) will not be successful. In addition, this provides numerous safety benefits. For example, if a charging cord is removed from an electric vehicle, or severed, while the vehicle is charging, the charging station 120 prevents electricity from flowing through the charging cord thus preventing a live charging cord (or a live severed charging cord with exposed wires) from lying on the ground.

In addition, the above described embodiments add convenience for the vehicle operators since it alerts them (e.g., through one or more notification messages) when the charging of their vehicles has been unexpectedly disconnected. This allows the vehicle operators to try to remedy the problem (e.g., return to their vehicle to plug in their charging cord into their vehicle (or perhaps a secondary charging cord), call for service, etc.). Also, it alerts the vehicle operators that their vehicle is not being charged so they may make alternative arrangements (e.g., arrange for alternative transportation if their vehicle cannot make a planned trip on its current charge, etc.).

In some embodiments of the invention, in order to prevent false positives of detecting an unexpected disconnection of a charging connection, the charging station controller 305 does not initialize the charging connection unexpected disconnection detection and response mechanism until it detects some actual charging is occurring. For example, when the charging station controller 305 detects that a threshold amount of electricity is flowing through the power receptacle 115 over a given amount of time, then the charging station controller 305 assumes that a charging connection has been established and initializes the charging connection unexpected disconnection detection and response mechanism of the charging station 120.

Figure 5:
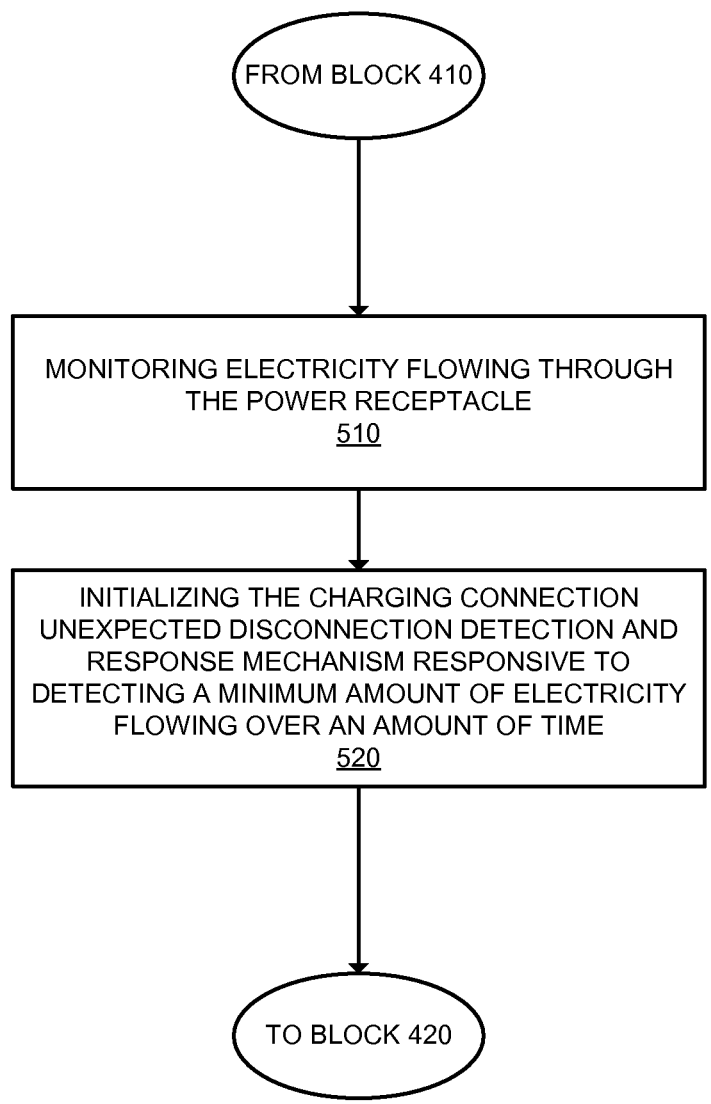
FIG. 5 is a flow diagram illustrating exemplary operations for preventing false positives of unexpected charging connection disconnections according to one embodiment of the invention.

FIG. 5 is a flow diagram illustrating exemplary operations for preventing false positives of unexpected charging connection disconnections according to one embodiment of the invention. The operations of FIG. 5 will be described with reference to the exemplary embodiment of FIGS. 1 and 3. However, it should be understood that the operations of FIG. 5 can be performed by embodiments of the invention other than those discussed with reference to FIGS. 1 and 3, and the embodiments discussed with reference to FIGS. 1 and 3 can perform operations different than those discussed with reference to FIG. 5.

In one embodiment of the invention, the operations of FIG. 5 occur after the operation described in reference to block 410 of FIG. 4. For example, in this embodiment of the invention, flow moves from block 410 to block 510. At block 510, the charging station controller 305 monitors the electricity flowing through the power receptacle 510 (e.g., the electricity measuring device 320 measures the current flowing on the power line 135 and/or measures the amount of power draw and transmits the appropriate data to the charging station controller 305). Flow moves from block 510 to block 520. At block 520, the charging station controller 305 initializes the charging connection unexpected disconnection detection and response mechanism response to detecting a minimum threshold amount of electricity (hereinafter referred to as "initialization amount") is flowing through the power receptacle 115 over a given period of time (hereinafter referred to as "initialization time"). In one embodiment of the invention, the initialization amount and the initialization time are each configurable (e.g., by administrators, owners, and/or manufacturers of the charging station 120). Flow moves from block 520 back to block 420 of FIG. 4.

Figure 6:
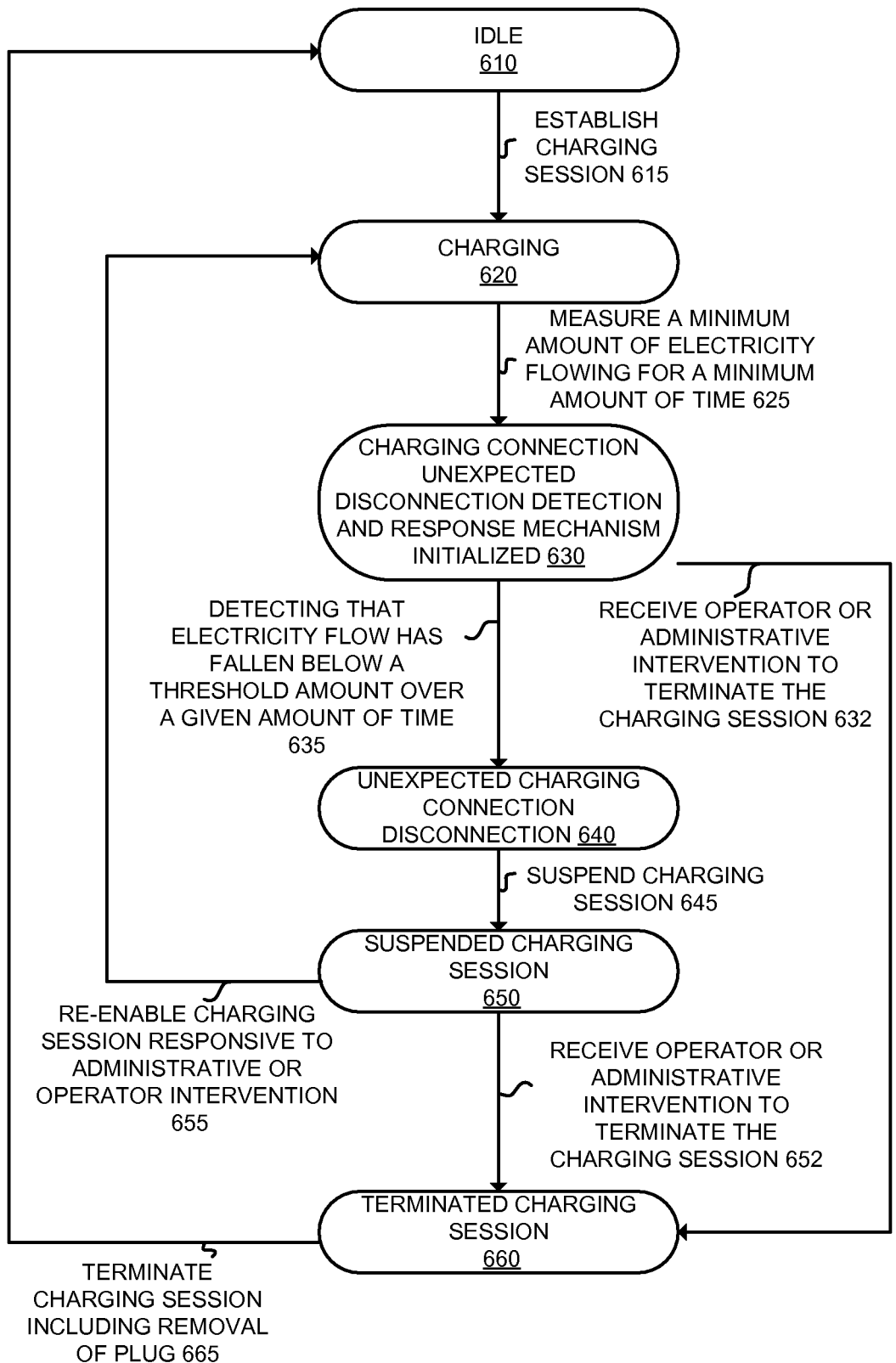
FIG. 6 is a state diagram illustrating exemplary states of the charging station according to one embodiment of the invention.

FIG. 6 is a state diagram illustrating exemplary states of the charging station 120 according to one embodiment of the invention. The charging station 120 is in the idle state 610 when there is not an active or suspended charging session and the charging station 120 is not currently being used. The charging station 120 transitions from the idle state 610 to the charging state 620 after a charging session has been established with a vehicle and charging has commenced (e.g., a charging connection has been established) 615. As described previously, establishing a charging session may include authorizing an operator, receipt of a plug into the power receptacle 115, and the closing and locking of the door covering the power receptacle 115.

The charging station 120 transitions from the charging state 620 to the charging connection unexpected disconnection detection and response mechanism initialized state 630 after measuring a minimum threshold amount of electricity flowing through the power receptacle 115 for a given amount of time 625.

The charging station 120 transitions from the charging connection unexpected disconnection detection and response mechanism initialized state 630 to the terminated charging session state 660 upon receiving operator or administrative intervention to terminate the charging session 632 (e.g., the charging is complete). For example, the operator 145 typically ends a charging session by swiping/waving the same RFID device to the RFID reader 330 that was used when establishing the charging session. As another example, if an operator has lost their RFID device, or if some other error has occurred, an administrator may end the charging session. It should also be understood that in some circumstances, the charging station may transition from the established charging session state 620 to the terminated charging session state 660.

The charging station 120 transitions from the charging connection unexpected disconnection detection and response mechanism initialized state 630 to the unexpected charging connection disconnection state 640 upon detecting that the flow of electricity has fallen below a threshold amount for a given amount of time 635. The charging station 120 transitions from the cord unplugged from vehicle state 640 to the suspended charging session state 650 upon the suspension of the charging session 645. In the suspended charging state 650, the charging cord 140 (e.g., the electrical connector 165) remains plugged into the power receptacle 115 and is locked behind the door covering the power receptacle 115.

The charging station 120 transitions from the suspended charging session state 650 back to the charging state 620 responsive to receiving administrative or operator intervention to resume charging. For example, the operator may swipe/wave their RFID device near the RFID reader 330 and select an option to resume charging. Alternatively, the charging station 120 transitions from the suspended charging session state 650 to the terminated charging session 660 responsive to operator or administrative intervention to terminate the session 652.

The charging station 120 transitions from the terminated charging session state 660 to the idle state 610 (e.g., after the charging cord has been removed from the power receptacle 115 and the door covering the power receptacle 115 is closed and locked).

As described previously, the trigger amount value, the trigger time value, the initialization amount value, and the initialization time value may each be configurable in some embodiment of the inventions. These values may be configured in different ways in different embodiments of the invention (e.g., through Telnet, through the host portal on the server 108, etc.). In one embodiment of the invention, these values may be configured for individual charging stations, for radio groups, and/or for logical groups. In one embodiment of the invention, in case of conflicts, a charging station's individual values override a radio group's values, which in turn overrides a logical group's values.

FIG. 7 is a block diagram illustrating an exemplary architecture of a charging station that may be used in some embodiments of the invention. It should be understood that while FIG. 7 illustrates various components of a computing device, it is not intended to represent any particular architecture or manner of interconnecting the components as such details are not germane to the present invention. It will be appreciated that other charging stations that have fewer components or more components may also be used with the present invention.

As illustrated in FIG. 7, the charging station 700, which is a form of a computing device, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the display controller & display device 770, Input/Output device(s) 780 (e.g., NIC (Network Interface Card), a cursor control (e.g., mouse, touchscreen, touchpad, etc.), a keyboard, etc.), and the transceiver(s) 1290 (wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, RFID, etc.)).

While embodiments of the invention have been described in reference to the power receptacles receiving charging cords, in alternative embodiments of the invention the charging cord may be attached differently to the charging station (e.g., the charging cord is permanently attached to the power receptacle and each of the electric vehicle operators use the same charging cord, the charging cord is permanently attached to the electricity source of the charging station, etc.).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for preventing electricity from flowing through a charging cord attached to an electric vehicle charging station, comprising:

establishing a charging session with an electric vehicle including allowing electricity to flow through the charging cord to charge an electricity storage device of the electric vehicle;

responsive to detecting a first amount of electricity is flowing through the charging cord over a first amount of time, initializing a charging connection unexpected disconnection detection and response mechanism;

during the charging session and after initializing the charging connection unexpected disconnection detection and response mechanism, performing the following to implement the initialized charging connection unexpected disconnection and response mechanism:
  responsive to detecting that a charging connection between the electric vehicle and the electric vehicle charging station has been unexpectedly disconnected, preventing electricity from flowing through the charging cord, wherein detecting that the charging connection has been unexpectedly disconnected includes determining that the electricity flowing through the charging cord to charge the electricity storage device of the electric vehicle has dropped below a configurable threshold second amount for a configurable second amount of time, and suspending the charging session.

2. The method of claim 1, wherein the charging cord is permanently attached to a power receptacle.

3. The method of claim 1, wherein the charging cord is received into a power receptacle from an operator of the electric vehicle.

4. The method of claim 1, further comprising causing a notification message to be transmitted to an operator associated with the charging session via an email message or a text message responsive to preventing electricity from flowing through the charging cord.

5. The method of claim 1, further comprising resuming the suspended charging session upon receiving administrative intervention or receiving intervention from an operator associated with the charging session to resume the suspended charging session.

6. The method of claim 1, further comprising: terminating the suspended charging session responsive to receiving administrative intervention to terminate the charging session or receiving intervention from an operator associated with the suspended charging session to terminate the charging session.

7. The method of claim 1, wherein the charging connection is unexpectedly disconnected due to the charging cord being disconnected from the electric vehicle while remaining connected to the electric vehicle charging station or being severed while remaining connected to the electric vehicle charging station.

8. An electric vehicle charging station, comprising:
  a power receptacle;
  a charging cord adapted to be attached to the power receptacle and to be connected to an electricity storage device of an electric vehicle;
  an electricity control device coupled with the power receptacle to control electricity to the power receptacle;
  an electricity measuring device coupled with the power receptacle to measure electricity flowing through the power receptacle to charge the electricity storage device of the electric vehicle;
  a charging station controller coupled with the electricity measuring device and the electricity control device, wherein the charging station controller is to perform the following:
    establish a charging session with the electric vehicle including causing the electricity control device to energize the power receptacle,
    initialize a charging connection unexpected disconnection and response mechanism in response to the electricity measuring device measuring a first threshold amount of electricity flowing through the power receptacle for a first amount of time, wherein the charging connection unexpected disconnection and response mechanism is to:
      detect, after the charging connection unexpected disconnection and response mechanism is initialized, that a charging connection to the electric vehicle has been unexpectedly disconnected when the electricity measuring device measuring that the electricity flowing through the power receptacle to charge the electricity storage device of the electric vehicle has dropped below a second threshold amount for a second amount of time, and
      responsive to the unexpected disconnection of the charging connection, cause the electricity control device to de-energize the power receptacle, and suspend the charging session.

9. The electric vehicle charging station of claim 8, wherein the electricity measuring device is to measure flow of electric current through the power receptacle.

10. The electric vehicle charging station of claim 8, wherein the electricity measuring device is to measure power draw.

11. The electric vehicle charging station of claim 8, further comprising a display unit to display one or more messages indicating that electricity has been stopped responsive to the electricity control device stopping electricity from flowing to the power receptacle.

12. The electric vehicle charging station of claim 8, wherein the charging station controller is further to cause a notification message to be sent to an operator whose charging session has been interrupted by the electricity control device stopping electricity from flowing to the power receptacle.

13. The electric vehicle charging station of claim 8, wherein the second threshold amount and the second amount of time are each configurable.

14. The electric vehicle charging station of claim 8, wherein the charging station controller is further to resume a suspended charging session upon receipt of administrative intervention or receipt of intervention from an operator associated with the suspended charging session to resume the suspended charging session.

15. The electric vehicle charging station of claim 8, wherein the charging station controller is further to terminate the suspended charging session responsive to receipt of administrative intervention to terminate the charging session or receipt of intervention from an operator associated with the suspended charging session to terminate the charging session.

16. The electric vehicle charging station of claim 8, wherein the charging connection is unexpectedly disconnected due to the charging cord being disconnected from the electric vehicle while remaining connected to the power receptacle of the electric vehicle charging station or being severed while remaining connected to the power receptacle of the electric vehicle charging station.

17. The electric vehicle charging station of claim 8, wherein the charging cord is adapted to be permanently attached to the power receptacle.

* * * * *